Figure 7:
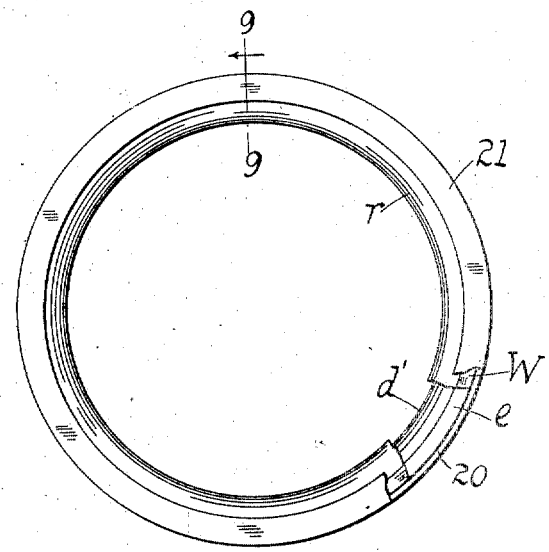

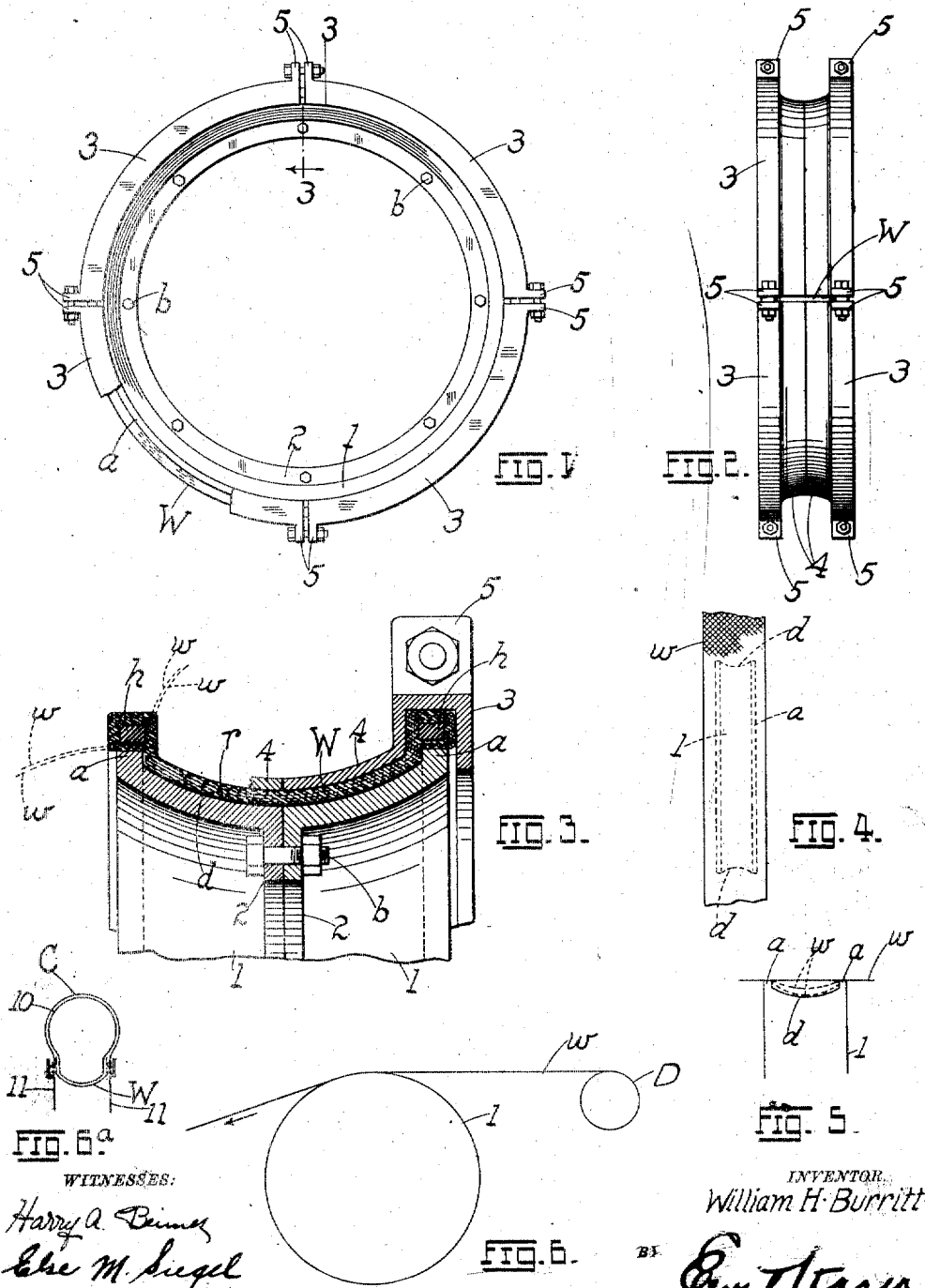

W. H. BURRITT.
TIRE CASING MOLD.
APPLICATION FILED MAR. 29, 1915.

1,214,888.

Patented Feb. 6, 1917.
2 SHEETS—SHEET 2.

WITNESSES:
Harry A. Bennett
Else M. Siegel

INVENTOR.
William H. Burritt
BY
Emil Storck
ATTORNEY.

UNITED STATES PATENT OFFICE.

WILLIAM H. BURRITT, OF ST. LOUIS, MISSOURI.

TIRE-CASING MOLD.

1,214,888.        Specification of Letters Patent.        Patented Feb. 6, 1917.

Application filed March 29, 1915. Serial No. 17,782.

*To all whom it may concern:*

Be it known that I, WILLIAM H. BURRITT, a citizen of the United States, residing at St. Louis, State of Missouri, have invented certain new and useful Improvements in Tire-Casing Molds, of which the following is a full, clear, and exact description, reference being had to the accompanying drawings, forming a part hereof.

My invention has relation to improvements in tire-casing forms or molds; and it consists in the novel construction of mold more fully set forth in the specification and pointed out in the claims.

The present invention is directed to the construction of forms or molds intended to produce a special design of tire casing, examples of which are to be found in pneumatic tires whose support does not depend on the presence of a rigid felly forming an element of the wheel to which the tire is attached. The casing referred to forms a complementary member of the usual outer tread casing, being interposed between said tread casing and the hub of the wheel, and preferably (though not necessarily) convexed toward the rotation axis of the wheel, being disposed interiorly to the outer tread casing, and jointly with the latter serving to protect the inner inflatable tube of the tire. An instance of such inner casing may be found in the construction of tire forming the subject-matter of my pending application filed July 29, 1912, serial number 711,998, the tire into which such a casing as an element enters being supported between two sets of spokes leading from the hub in two distinct planes spaced a suitable distance apart. The elimination of the usual felly as a supporting member for the tire, imposes on the inner casing a distinct function which it could not successfully fulfil were it not for the resiliency inherent in the medial portions of the casing, such resiliency permitting the casing to yield, under either a load or under impact, in the general plane of rotation of the wheel, such resiliency resulting from the formation of the casing on the mold or form which constitutes the subject-matter of the present application. The invention is susceptible of more than a single form, but whatever guise it may assume, the object sought is to produce a casing which will possess the attributes of elasticity or resiliency throughout its medial portion, permitting the casing to yield in the general plane of rotation of the wheel, under the load and impact conditions heretofore indicated. The invention in detail may be best described in connection with the accompanying drawings in which—

Figure 8:
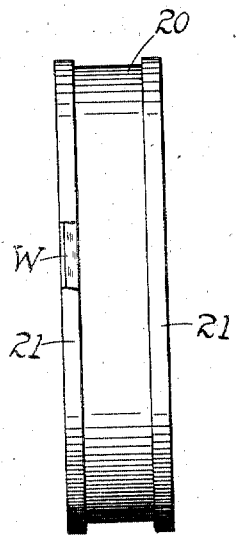
Figure 9:
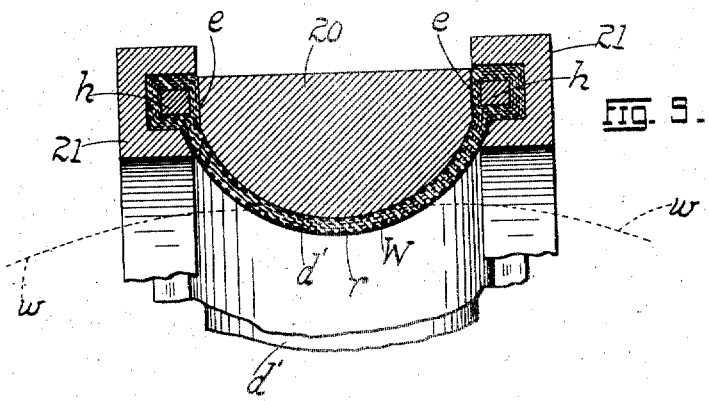
Figure 10:
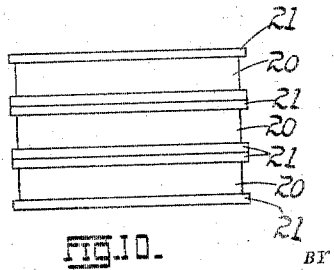

Figure 1 is a side elevation of one form of mold with a portion of one of the clamps removed, to expose the fabric or duck layers entering into the construction of the casing; Fig. 2 is an edge view of Fig. 1; Fig. 3 is an enlarged cross-sectional detail on the line 3—3 of Fig. 1, with the clamp on the left, removed; Fig. 4 is a plan of a short length of the web or fabric superposed over the mold, showing the manner of application of the fabric to the mold; Fig. 5 is a diagrammatic cross-section through the web and the peripheral groove of the mold illustrating the manner of the settling of the fabric into the groove, when tension is applied to the fabric in a direction conforming to a plane at right angles to the axis of the mold; Fig. 6 is a diagrammatic side elevation of a roll from which the web unwinds and of the form or mold over which it is drawn; Fig. 6ᵃ is a diagrammatic cross-section of the complete tire; Fig. 7 is a view on the order of Fig. 1 showing a modified form of mold and clamps therefor; Fig. 8 is an edge view of Fig. 7; Fig. 9 is an enlarged cross-section on the line 9—9 of Fig. 7; and Fig. 10 is a diagrammatic elevation of a series of molds piled one on top of the other during the molding or forming of the casings.

Referring to the drawings, and for the present to Figs. 1 to 6ᵃ inclusive, 1, 1, represent two ring sections of a mold or form separable along a plane disposed at right angles to the axis of the mold, the two sections being united by bolts $b$ passed through flanges 2 disposed on opposite sides of the plane of separation of the sections. The outer surfaces of the walls of the sections are concaved, so that when the sections are assembled there results a peripheral outwardly concaved groove or depression $d$ on the mold ring thus formed, said depression being bounded by the terminal flanges $a$ the surfaces of whose edges are cylindrically disposed (Fig. 3).

A web or strip of duck or canvas $w$ such as usually enters into the composition of tire casings before vulcanization, will, if passed across the flanges $a$ of the mold adhere more or less to said flanges; and if the web is then pulled or drawn taut in the general plane of disposition of the mold (that is to say in a plane at right angles to the axis of the mold) the medial portions of the web not adhering to the flanges will gradually yield under the strain imposed on the sides of the web which do adhere to said flanges, and thus yielding, will gradually settle into the depression $d$ (see dotted positions of the web in Fig. 5) where they will adhere more or less to the periphery of the mold. The yielding of the medial portions of the web $w$ under the conditions as described is characteristic of any web cut on the bias as shown in Fig. 4. If in thus drawing a web or strip over the mold as indicated we employ a length sufficient to pass around the entire circumference of the depression $d$ (or periphery of the mold) we would then have a single wrap of duck or its equivalent whose cross-sectional contour would correspond to the curvature of the cross-section of the depression $d$. Having thus secured a single wrap, we can by the same method of procedure secure any number of wraps to produce the required thickness for the casing member desired. In Fig. 3 for example four web layers are successively wrapped about the form, each layer as wrapped sagging with its medial portions into the depression $d$ and adhering more or less to the layer which immediately preceded it. In practice a layer of rubber $r$ is first deposited in the depression $d$ before the web layers are "molded" thereon in the manner specified. A convenient way of applying the web is to have the same mounted on a roll D whence it may be drawn over the mold ring 1 (Fig. 6) and wrapped about it in consecutive layers, sections of the web corresponding in length to a single wrap or layer being cut off from the roll as the successive sections are applied. In the present illustration (Fig. 3) the completed casing W is made up of four wraps of web $w$, an outer layer of rubber $r$, and the side beads $h$. The latter are attached to the layers $w$ substantially as follows: After the four wraps of the webs $w$ of the duck or canvas have been deposited and molded in the peripheral depression $d$, the side edges of the strips $w$ (which by the way are considerably wider than the mold) are left to project over the outer corners of the flanges $a$, two of the sides so projecting being turned inward and two outward (see dotted showing in Fig. 3). Thereupon the beads $h$ are passed over the flanges $a, a$, and over the base of the two outwardly turned projecting sides of the webs $w$, after which the four free edges of the webs are alternately folded over the bead until the latter is covered by the fabric, thus incasing the bead as fully shown in Fig. 3. This being accomplished there are passed over the beads $h$ and the flanges $a$ supporting the same, a series of channel clamps 3, the inner flange of each clamp being provided with a lateral curved extension 4, the curvature of said extension conforming to the concavity of the depression $d$ and to the concavity assumed by the layers of duck $w$. The extensions of opposing clamps meet along the plane of division between the ring sections 1, 1, (Fig. 3). There are four clamps to each ring 1, the terminals of the clamps being provided with lugs 5, through which the several clamps may be bolted or otherwise tied together, and to the ring. I do not wish to be restricted to any number of clamps or clamp sections, as these may be varied, but I find four to be convenient in practice. The clamp sections when assembled about the ring may be regarded as a single clamp encompassing the bead $h$, the extension 4 of the clamp bearing on the casing body W. The casing with its beads $h$ and outer rubber layer $r$ being thus clamped to the mold (or mold ring), the ring is then placed into a vulcanizing chamber and the rubber constituents of the casing thoroughly vulcanized as well understood in the art, after which the clamps are detached and the finished casing removed from the mold.

As previously pointed out, the casing W forms the inner member of a tire provided with an outer casing C, the two casings enveloping the inflatable tube 10, and the tire being supported from the sides by the spokes 11, 11. This form of tire is shown diagrammatically in Fig. 6ª and conforms in all essential particulars with the tire forming the subject-matter of my pending application aforesaid.

In the form of mold described, the surface of the depression $d$ concaves outwardly, the longitudinal medial line thereof forming a circle described by the shortest radius from the axis of the mold as a center, and the outer corners of the peripheral faces or edges of the flanges $a, a$, forming circles described by the longest radii from the same center. It thus follows that the crown of the transverse arch formed by the depression $d$ and hence the crown of the arch formed by the transverse curvature of the molded casing W will be disposed along a circle described by the shortest radius from the center of the mold, and the outer edges of the bead formations of said casing will be disposed along circles described by the longest radii from the same center. Accordingly, a mold which will produce a casing with these characteristics will be an equivalent of the form already described, and in the modification covered by Figs. 7 to 10 inclusive such an equivalent is illustrated.

In the modification referred to (Figs. 7 to 10) I show a ring 20 having an inner convexed formation $d'$. In this form the webs of duck $w$ are disposed the same way as in the first form described, that is to say with the narrow dimension of the web across the surface d', the free edges of the web being brought up along the sides of the curved surface and up along the plane side terminals e (Fig. 9), said terminals forming ledges for the deposit of the beads h. Over the beads are passed the clamping channel-rings 21 as shown. The strips w being of uniform length and width, it follows that in order to bring the side edges thereof to the full dimensions of the larger circles defined by the side edges of the ring (or outer edges of the ledges e) the fabric, which is cut on the bias by the way, must be stretched circumferentially so that the outer portions of the finished casing are taut or stretched, whereas the medial portions which are nearer the smaller circle or that described by the shorter radius are yielding and elastic, as these have not been stretched to the point where they cease to be elastic. In the modification the rubber layer r is deposited on the outside of the web casing W, before the clamps 21 are applied, after which the ring with its clamps, or a series forming a pile as shown diagrammatically in Fig. 10 are placed in the vulcanizing chamber.

It will be seen from the foregoing that whether the casing be molded on the form shown in Fig. 3 or on that shown in Fig. 9, the resulting product will be such as to possess a longitudinally yielding or elastic medial portion (that is to say a portion yielding in the general plane of rotation of the wheel on which the casing is finally mounted) for taking up jars or impacts with the passage of the vehicle over rough surfaces, the outer casing C being in no wise disturbed or disarranged. There thus results an easy riding vehicle as fully pointed out in my pending application aforesaid. Whether the casing be molded on a form or mold having a peripheral outwardly concaved depression, or on a mold having an inner convexed formation, the result is the same since each curved molding surface has its longitudinal (that is to say circumferential) medial line defined by a circle described by a short radius from the center of the mold (or wheel on which the casing is finally deposited), and the side edges defined by circles described by longer radii from the same center; and the reason that the "stretch" is not taken out of the web strips of which the casing is composed, in the regions bordering on such medial line, is because these portions of the web being nearest to the axis of the mold, there is no necessity of initially stretching the fabric to maintain said portions at the point desired, whereas the sides of the webs or strips must be stretched to bring them to, and maintain them at, the points defined by the side edges of the completed casing.

In the examples shown, the surfaces d, d', are substantially bowed arches, that is to say the same follow a transverse curve across the mold ring or member; but I do not wish to be restricted to a bowed arch, as the same may be flat, that is to say the cross-section of the molding surface may approach that of a channel bar or be U-shaped. Accordingly the term "arched" as used in the claims must not be taken in a restricted sense but is to be construed broadly to cover any surface which necessitates the folding of the edges of the web or strip outwardly or away from the axis of the mold member.

Having described my invention what I claim is:

1. A mold of the character described, comprising an annular member or ring having a transversely arched surface for the deposit and support of the material to be shaped or molded, the center of the arch being nearest the geometric center of the ring, and the portions of the arch on either side of the center thereof being at greater distances from said geometric center, and a member detachable from the ring clamping the material thus supported, to the ring during vulcanization.

2. A tire-casing mold of the character described, comprising an annular member or ring having a transversely arched surface for the deposit of the material to be shaped or molded, the center of the arch being nearest the geometric center of the ring, annular formations adjacent the edges of said surface for the support of beads forming component parts of the casing, and clamps adapted to pass over the beads thus supported for holding the latter to their supporting surfaces during the vulcanizing process.

3. A tire-casing mold of the character described, comprising an annular member or ring having a transversely arched surface for the deposit of the material to be shaped or molded, the center of the arch being nearest the geometric center of the ring, annular formations on the sides of the arched surface for the support of beads forming component members of the finished casing, and clamps operating to hold the beads to said formations and the material to the supporting face aforesaid.

4. A tire-casing mold comprising a ring provided with a peripheral transversely arched depression for the support of the material to be molded, flanges bounding the sides of said depression and projecting radially beyond the surface of said depression, the peripheral faces or edges of the flanges forming supporting surfaces for the bead components of the casing, and sectional annular channel clamps passed over the beads thus supported and spanning the sides of the flanges, the inner flange of the clamp being provided with an extension curved to conform to the material molded on the surface of the peripheral depression aforesaid, and hold the said material to the mold during vulcanization of the tire.

5. A mold ring for tire casings provided with a peripheral external concaved depression and bounding bead-supporting formations disposed on the sides of said depression, in combination with members operating to encompass the beads and hold the same to the formations aforesaid.

6. A mold ring for tire casings provided with a transversely arched surface bowed toward the axis of the ring and bounding bead-supporting formations disposed at the sides of said surface, in combination with sectional, annular, channel members operating to hold the beads to the formations aforesaid.

7. A mold ring for tire casings provided with a transversely arched surface bowed toward the axis of the ring and bounding bead-supporting formations disposed at the sides of said surface, in combination with annular channel members operating to hold the beads to the formations aforesaid.

8. In combination with a marginally and peripherally flanged mold ring, an annular sectional channel clamp adapted to be detachably passed over the flange and provided with a lateral extension leading from the inner flange of the channel across the material deposited on the peripheral surface of the ring beyond the flange thereof, and means on the clamp sections for drawing the sections tightly about the ring.

9. A tire-casing mold provided with an annular transversely arched surface bowed toward the axis of the mold for the support of the material, and having suitable side bead-supporting formations, in combination with detachable annular channel clamps operating to span the beads and hold the same to the formations aforesaid.

10. A tire-casing mold provided with an annular transversely arched surface bowed toward the axis of the mold for the support of the material, and having side bead-supporting formations, in combination with means for engaging the beads and holding them to said formations.

11. In combination with a marginally and peripherally flanged mold ring having a transversely arched surface bowed toward the axis of the ring, a channel clamp adapted to be passed over the flange of the ring and provided with a lateral extension leading from the channel across the arched surface of the ring and engaging the material deposited on said surface.

In testimony whereof I affix my signature, in presence of two witnesses.

WILLIAM H. BURRITT.

Witnesses:
 EMIL FRANK,
 ELSE M. SIEGEL.